(12) United States Patent
Haas

(10) Patent No.: US 9,610,697 B2
(45) Date of Patent: Apr. 4, 2017

(54) PUNCHING TOOL

(75) Inventor: Anton Haas, Ardagger (AT)

(73) Assignee: BOEHLER-UDDEHOLM PRECISION STRIP GMBH, Boehlerwerk (AT)

( * ) Notice: Subject to any disclaimer, the term of this patent is extended or adjusted under 35 U.S.C. 154(b) by 922 days.

(21) Appl. No.: 13/517,474

(22) PCT Filed: Jan. 17, 2011

(86) PCT No.: PCT/AT2011/000026
§ 371 (c)(1),
(2), (4) Date: Jun. 20, 2012

(87) PCT Pub. No.: WO2011/091454
PCT Pub. Date: Aug. 4, 2011

(65) Prior Publication Data
US 2012/0279370 A1    Nov. 8, 2012

(30) Foreign Application Priority Data
Jan. 26, 2010 (AT) ..................... 101/2010

(51) Int. Cl.
*B26F 1/44* (2006.01)
*B21D 37/20* (2006.01)
(Continued)

(52) U.S. Cl.
CPC .............. *B26F 1/44* (2013.01); *B21D 37/205* (2013.01); *B23P 15/406* (2013.01); *C21D 1/26* (2013.01);
(Continued)

(58) Field of Classification Search
CPC ................ B26F 1/44; B26F 2001/4436; B26F 2001/4463; B26F 2001/4481;
(Continued)

(56) References Cited

U.S. PATENT DOCUMENTS 2,097,693 A * 11/1937 Foster ...................... C14B 5/02
76/107.8
2,300,526 A * 11/1942 Ryan ........................ C14B 5/02
83/652

(Continued)

FOREIGN PATENT DOCUMENTS

AT          360 483       1/1981
DE         31 35 980      6/1983
(Continued)

OTHER PUBLICATIONS

Austrian Search Report conducted in counterpart Austrian Appln. No. A 101/2010 (Jun. 23, 2010).

*Primary Examiner* — Jonathan Riley
(74) *Attorney, Agent, or Firm* — Greenblum & Bernstein, P.L.C.

(57) ABSTRACT

A stamping tool formed from a steel strip and method of forming the stamping tool. The stamping tool is formed from a steel strip shaped on a narrow side with a cutting part having a cutting edge. The stamping tool includes a back part with a contour in cross section on a narrow side of the steel strip, recesses shaped in the back part with free spreading of the material to be transverse to a longitudinal extension of the steel strip and perpendicular to lateral surfaces of the steel strip, such that an extent of the spreading is smaller than a thickness of the steel strip, and undeformed regions located between the recesses.

15 Claims, 4 Drawing Sheets

(51) Int. Cl.
   *B23P 15/40* (2006.01)
   *C21D 1/26* (2006.01)
   *C21D 9/22* (2006.01)

(52) U.S. Cl.
   CPC ........ *C21D 9/22* (2013.01); *B26F 2001/4436* (2013.01); *B26F 2001/4463* (2013.01); *Y10T 83/929* (2015.04)

(58) Field of Classification Search
   CPC .............. B26F 2001/4472; B26F 1/46; Y10T 83/9295; Y10T 83/9449; Y10T 83/93; Y10T 83/9302; Y10T 83/9304; Y10T 83/9307; Y10T 83/929; Y10T 83/9423; B23P 15/406; B21D 37/205; C21D 1/26; C21D 9/22
   USPC .................................................. 493/229, 237
   See application file for complete search history.

(56) References Cited

U.S. PATENT DOCUMENTS

| | | | | |
|---|---|---|---|---|
| 2,863,337 | A * | 12/1958 | Ackley | B21D 37/205 101/401.1 |
| 3,203,295 | A | 8/1965 | Sauer | |
| 3,302,490 | A * | 2/1967 | Bishop | B23P 15/406 76/107.1 |
| RE26,192 | E * | 4/1967 | Martin | B21D 37/205 76/107.8 |
| 3,383,969 | A * | 5/1968 | Saunders | B26F 1/44 493/340 |
| 3,570,355 | A * | 3/1971 | Spengler | B21D 37/205 76/107.1 |
| 3,645,155 | A * | 2/1972 | Robinson | B23P 15/406 76/107.8 |
| 3,654,795 | A * | 4/1972 | Freber | 72/329 |
| 4,568,323 | A * | 2/1986 | Roeder | B26F 1/44 493/363 |
| 4,729,274 | A * | 3/1988 | Marbach | B26F 1/44 76/107.8 |
| 4,754,677 | A | 7/1988 | McKindary | |
| 4,825,740 | A * | 5/1989 | Mucci, Sr. | 83/652 |
| 6,408,729 | B1 * | 6/2002 | Johnson | B26D 7/18 83/164 |
| 7,160,237 | B2 * | 1/2007 | Hashimoto | B29C 53/06 493/356 |
| 2002/0073805 | A1 * | 6/2002 | Simpson | B26F 1/44 76/107.8 |
| 2004/0023773 | A1 * | 2/2004 | Dombkowski | B26F 1/44 493/340 |
| 2006/0179995 | A1 * | 8/2006 | Angevine | B26F 1/44 83/686 |
| 2012/0181326 | A1 * | 7/2012 | Takeuchi | B26F 1/44 229/100 |
| 2013/0125725 | A1 * | 5/2013 | Roos | B26D 1/0006 83/684 |

FOREIGN PATENT DOCUMENTS

| | | |
|---|---|---|
| DE | 296 16 585 | 1/1998 |
| DE | 199 41 625 | 3/2001 |
| EP | 0 800 875 | 10/1997 |
| JP | 57-081099 | 5/1982 |
| WO | 2009/121383 | 10/2009 |

* cited by examiner

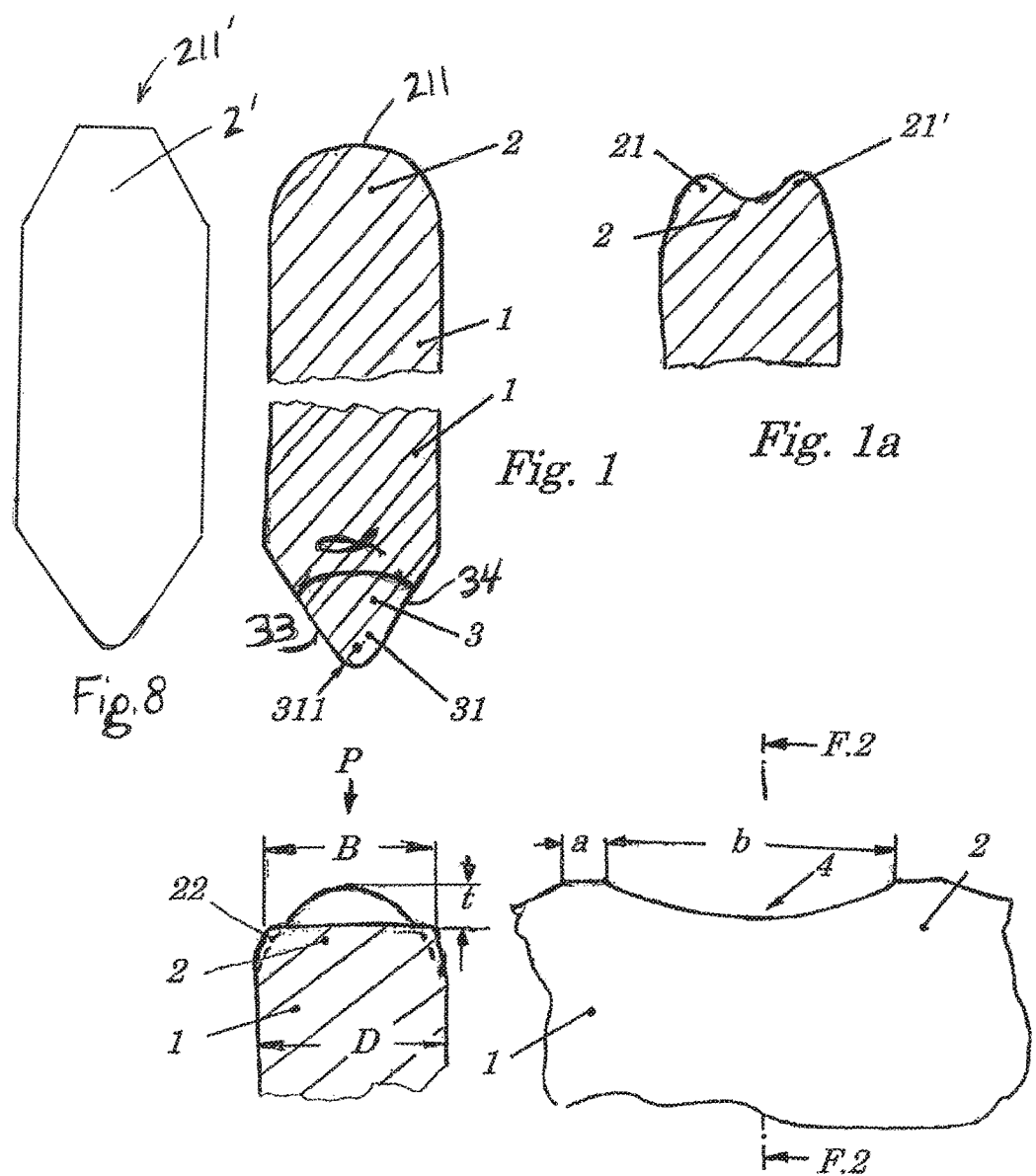

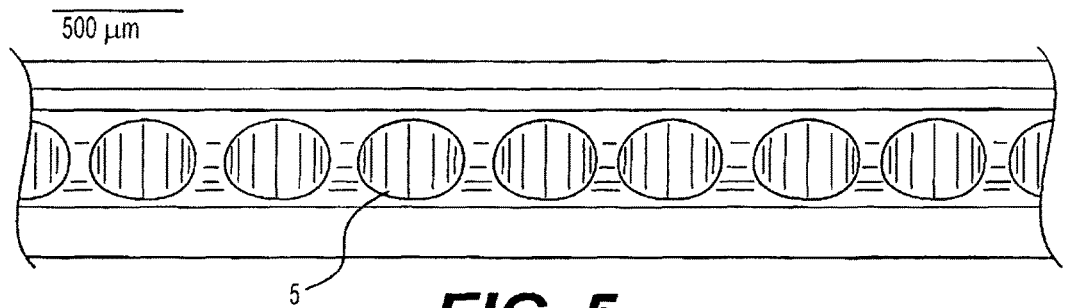
FIG. 5
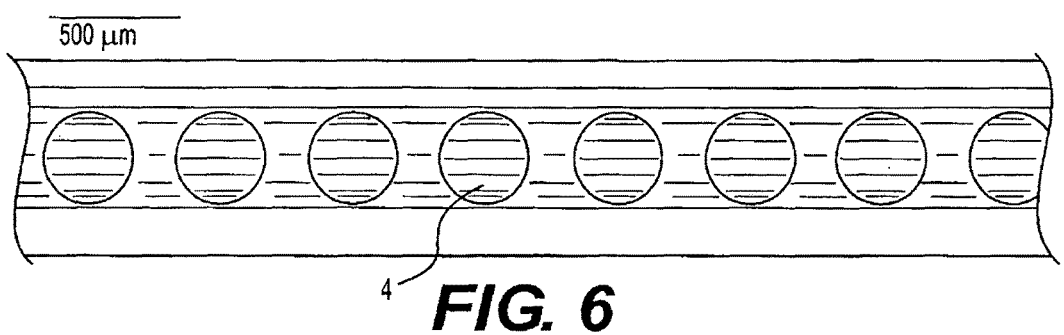
FIG. 6
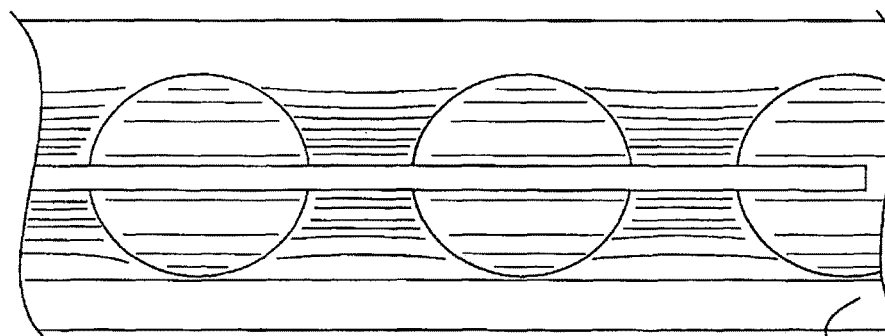
FIG. 6A/B
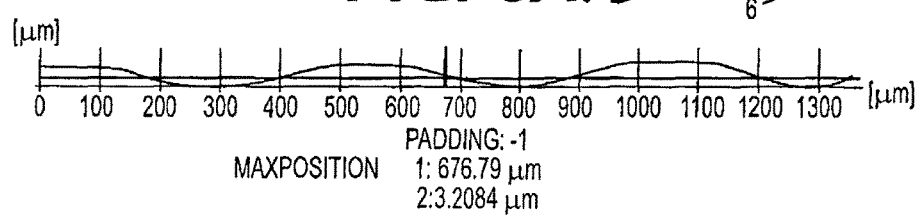

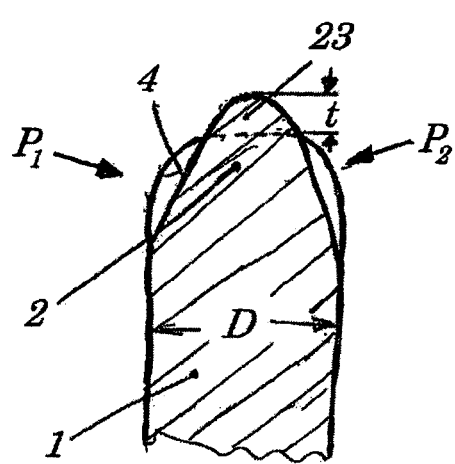
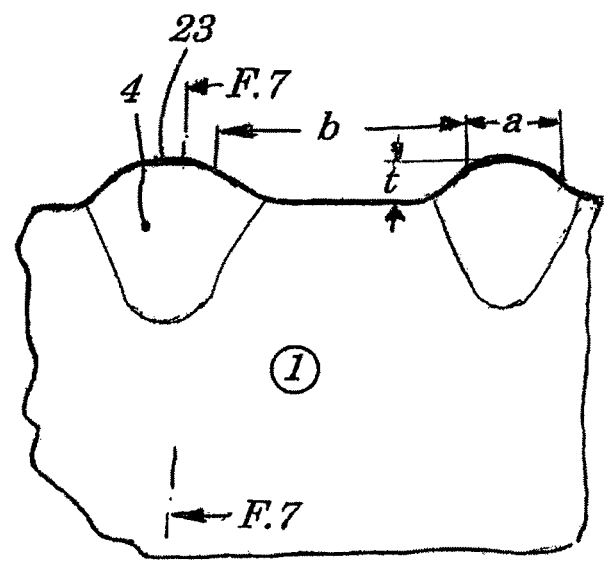
Fig. 7                                    Fig. 7a

PUNCHING TOOL

CROSS-REFERENCE TO RELATED APPLICATIONS

The present application is a U.S. National Stage of International Patent Application No. PCT/AT2011/000026 filed Jan. 17, 2011, and claims priority under 35 U.S.C. §§119 and 365 of Austrian Patent Application No. A 101/2010 filed Jan. 26, 2010.

BACKGROUND OF THE INVENTION

1. Field of the Invention

The invention relates to a stamping tool, in particular a cutting rule, formed from a thermally treated and/or quenched and tempered steel strip, shaped on the narrow sides with, on the one hand, a cutting part with a cutting edge and, on the other hand, with a back part.

2. Discussion of Background Information

Stamping tools, in particular cutting rules, are used to divide or perforate flat materials, such as paper, cardboard, plastic films and the like in flatbed stamping machines and/or in rotational stamping machines.

The problems of producing a desired cut and a proposed solution are disclosed by WO 2009/121383. It is proposed in this document to provide projections on the back of the cutting rule, which projections can be plastically deformed during the first use of the tool and in this manner automatically cause an optionally necessary local or regional height leveling of the cutting rules in the carrier plate between the stamping plate and the upper plate of the stamping machine, a so-called leveling of the tool.

The projections on the back of the cutting rule are produced by a precise chip-removing routing of the spaces, for example, by grinding, milling and the like.

Furthermore, it is proposed in the above document to provide a surface decarburization in the back region of the cutting rule in order to achieve a facilitation of the plastic deformation of the projections with an automatic leveling during the first use.

According to reports, elevations were produced experimentally on the back of cutting rules by the application of foreign material, which elevations are designed to cause a leveling of the tool by means of deformation during a first cutting load.

The above-mentioned measures and embodiments of the back parts of cutting rules can definitely render possible an automatic leveling of the same during a first cutting load, but have in common the disadvantage of a complex production of the recesses in the contour and the problem of a deformation path that can be adjusted in a targeted manner, depending on a local stress of the back part of the cutting rule for an automatic leveling in the stamping machine that preserves the tool and the plates. Furthermore, the operator of stamping machines requires an increase in tool life and an avoidance of fatigue fractures of the cutting rules.

SUMMARY OF THE EMBODIMENTS

Embodiments of the invention are directed to a stamping tool, in particular a cutting rule, that can be produced cost-effectively with improved properties compared to the prior art. The tool with an automatic leveling has favorable functions preserving the plates of the stamping machine and in continuous stamping operation has a longer, fault-free period of use or a higher service life. Furthermore, the quality of the punched material, the so-called useful parts, is to be improved by a clean cut and reduced holding points.

Accordingly, a stamping tool, in particular a cutting rule, can be shaped from a thermally treated or quenched and tempered steel strip, shaped on the narrow sides with a cutting part with a cutting edge and with a back part with a convex contour in cross section or a contour composed of several projecting convex regions. The contour has recesses in some places transverse to the longitudinal extension and perpendicular to the lateral surfaces. Further, the stamping tool, in particular the cutting rule, can be shaped in a chipless manner by cold forming or embossing with free spreading of the material. The extent of the spreading is smaller than the steel strip thickness and the undeformed regions between the recesses can be plastically deformed with a startup of the tool.

In accordance with embodiments of a stamping tool, in particular a cutting rule, if the back part has, at least on one lateral surface of the steel strip, recesses shaped in some places at an angle thereto perpendicular to the longitudinal extension in a chipless manner by cold forming with free spreading of the material, as well as elevations formed thereby over the contour of the back part, wherein the elevations or regions projecting in the opposite direction to the cutting area can be plastically deformed with a startup of the tool. The advantages achieved with the invention are to be seen essentially in that with a chipless cold forming in the end-face region of the back part of the tool or the cutting rule, recesses can be worked or elevations can be formed in a cost-effective manner. In this manner, a necessarily different force increase can be adapted depending on the path with the plastic deformation of the undeformed regions or the elevations projecting due to deformation on the back part of cutting rules towards the cutting edge according to the requirements of the respective stamping machines with an automatic leveling of the tool. This is particularly important when a plane parallelism of the plates in the flat-bed stamping machines and/or rotational stamping machines is not available or adjustable to a sufficient extent.

The material hardening depending on the deformation displacement with an automatic leveling of the tool is of essential importance for an embodiment of the plastically deformed regions. Because the recesses between the undeformed regions of the back part of the cutting rule have already been produced by local plastic shaping with a material hardening, advantageous criteria for the leveling of the cutting rule with the startup of the tool are achieved. In other words, the local gradient of the increase in force on the cutting edge can be adjusted with an automatic leveling of the cutting rule according to the requirements of the flat-bed stamping machines and/or rotational stamping machines by an embossing of recesses in the back part with free spreading.

According to the invention, to avoid an excessive edge bulging of the material with narrow bending radii of the cutting rule, it is provided that the extent of the spread during the working of the recesses by cold forming is smaller than the steel strip thickness. This is achieved by an embodiment of the convex contour of the back part of the cutting rule, wherein the regions of the compressed material, projecting in some places beyond the original contour, have a thickness of 60% to 85% of the thickness of the cutting rule. In this manner, favorable prerequisites can be achieved for an automatic leveling of the cutting rule in operationally continuously loaded stamping machines, and even narrow radii can be achieved advantageously with an in particular mechanical bending of the cutting rule during the production of tools.

In the case of sustained loading tests, it has been found that compressed zones cause compressive residual stresses in the deformation region of the back part of cutting rules, which prevent a crack formation or a fatigue fracture with alternating and/or swelling mechanical stresses.

However, if recesses are produced with machined flutes in the transverse direction of the sheet, these machined flutes can act as crack initiation points with a continuous load and lead to premature breakage of the tool.

If, as can be provided in an advantageous manner, the perpendicular recesses in the contour have an extent of 5 µm to 80 µm, preferably 20 µm to 50 µm, due to the hardening achieved in the deformation region of the back part, a particularly advantageous leveling of the cutting rules can be achieved with a regulated compression of the undeformed regions up to the hardened zones.

A major advantage with an automatic zone leveling of cutting rules in a tool can be achieved when the longitudinal extension of the shaped recess to the longitudinal extension of the undeformed region in the back part yields a value of 1.0 to 4.9, preferably 1.5 to 3.0.

Furthermore, in a favorable manner for a zone leveling, the distance between two recesses or two undeformed regions can have a measurement of 0.1 mm to 0.95 mm, preferably 0.35 mm to 0.65 mm.

According to a special embodiment of a cutting rule according to the invention, it can be provided that the convex contour of the back part in cross section is formed by one or more rounded or polygonal region(s). In this manner a high lateral stability and a facilitated leveling of the tool can be achieved.

According to a special embodiment of the invention, as previously stated, local elevations can also be produced over the contour of the back part of cutting rules by cold forming with free spreading of the material by means of recesses worked in some regions perpendicular to the longitudinal extension in the lateral surface(s) of the steel strip at an acute angle thereto. This essentially lateral chipless cold forming produces excellent elevations in the contour due to the material flow, wherein even with elevations produced in this manner, compressive stresses remain in the back part with loads, which largely rule out the formation of fatigue fractures.

A stamping tool with lateral embossing can be particularly preferred when the elevations over the contour of the back part, formed by deformation of the lateral parts at an angle to one another, have an extent of 20 µm to 90 µm, and are spaced apart by a length of 0.1 mm to 0.95 mm.

According to an advantageous embodiment of a stamping tool, in particular of cutting rules, according to the invention, the strip body is composed of low-alloy steel with an inner zone that has a carbon content between approx. 0.3% by weight to approx. 0.95% by weight and a fine structure achieved by a conversion during a quenching and tempering preferably in the lower bainite range, as well as a hardness of 280 HV to 480 HV and preferably has a surface decarburization zone with a depth of 0.01 mm to 0.05 mm, preferably 0.02 mm to 0.04 mm on the lateral surfaces.

If, as can be further provided, the undeformed regions or the elevations on the back part of the stamping tool, in particular the cutting rule, up to a depth of no more than 95 µm have a tempering structure formed at a temperature between 300° C. and the austenite formation temperature of the material, particularly favorable properties of the material are achieved for an automatic leveling.

Studies have shown that in the lower temperature range of bainitic hardening a transformation of the face-centered cubic lattice of the steel alloy into a body-centered cubic atomic lattice with smallest carbides takes place, wherein high material hardnesses are achieved. From a temperature of 300° C. with a temper heating, a drop in hardness takes place, which is due to a shaping of the carbides to form larger complexes. At higher tempering temperatures, despite higher starting hardness, the temper hardness of bainite can fall below that of pearlite, whereby particularly advantageously low material hardness values of the undeformed regions or the elevations on the back part of a cutting rule can be achieved.

A superficial tempering of the back part having a bainite structure can also take place before an embossing in some places in the contour region.

Because with a processing by embossing the contour in some places on the back part of a cutting rule, a force can now be formed in the direction towards the cutting edge, it is favorable for dimensionally technical reasons if the cutting region is formed with a hardness of greater than 52 HRC or 550 HV to 61 HRC or 720 HV and a rounded cutting edge with a radius between 0.004 mm and 0.05 mm is formed and acts as an adjusting measure with an embossing of the contour. The same applies to a cutting angle of 50° to 100° with or without cutting edge geometries with primary and secondary facets.

According to the tribological properties of the punched or perforated material on the tool, the surface of the cutting part in the cutting edge region of the cutting rule can have a scraped, a ground and/or a coated embodiment.

Disclosing a production method for a stamping tool, in particular for a cutting rule of the type mentioned at the outset, in which firstly a strip-shaped blank with a bainitic fine structure and preferably with decarburized edge zone is produced from a flat starting material, is achieved according to embodiments of the invention essentially in that, in a first step, a back part with a convex contour and a conical cutting part are shaped by machining on the narrow sides of the blank or strip blank. In a second step, essentially at room temperature recesses are worked in some places transversely to the longitudinal extension and perpendicular to the lateral surfaces of the strip over the length thereof into the convex contour of the back part by chipless shaping with free spreading of the material, and the undeformed regions of the back part are used as the elements giving the desired width measurement of the tool or of the cutting rule during the production of a cutting edge.

The advantages achieved with the method according to the invention are to be seen essentially in that a targeted preparation of the back part with a subsequent chipless insertion of recesses into the convex contour by embossing result in a cost-effective production and in a desired property profile of the undeformed regions for a compression within the scope of an automatic leveling with a startup of the tool.

A preparation of the back part or a shaping of a convex contour by a chip removal must thereby be coordinated with the chipless cold forming or embossing, so that with a free spreading of the material the flow regions have a smaller transverse measurement than corresponds directly to the cutting rule.

With an embossing itself, the material hardens locally depending on the extent of the deformation and the structure. A necessary local or regional change of width of a cutting rule with an automatic leveling of the same by compression of regions on the back part with a first stamping load can be adjusted in a targeted manner according to the invention by a configuration and a local material hardening of the cold forming regions. In this manner, not only is a cost-effective production method for a cutting rule achieved, but the leveling conditions thereof can also be optimized with a first stamping load.

Another embodiment of a production method for a stamping tool, in particular for a cutting rule, with high cost-effectiveness and the best properties with an automatic leveling in a flatbed and/or rotational stamping device can be created according to the invention if in the above method, in a second step essentially at room temperature, recesses are worked at least on one lateral surface in the region of the back part at an angle thereto perpendicular to the longitudinal extension of the strip by chipless shaping with free spreading of the material. In this manner, elevations are formed over the contour of the back part, and the elevations projecting in the opposite direction to the cutting region are used as the elements giving the width measurement of the tool or the cutting rule during the production of a cutting edge.

With a method of this type, in which a free spreading or a flow of the material with embossing of the lateral surfaces in some places takes place over the contour region of the back part and forms elevations, a bending of the cutting rule with narrow radii can take place without a camber of the lateral surfaces in the region of the back part being formed.

For an adjustment of favorable material properties for a deformation of parts of the back region with an automatic leveling, it can be advantageous if with a fine structure of lower bainite in the strip before or after the first step and/or after the second step of the production sequence the regions left undeformed or the regions or elevations projecting beyond the contour are tempered up to a depth of the same of no more than 95 μm at a temperature between 300° C. and the austenite temperature of the alloy. A tempering of this type of a lower bainite structure leads to a molding of the fine carbides and as a result to a major reduction of the moisture and an increase of the flowability of the material. For a plastic deformation to a desired extent of undeformed regions or regions compressed in a projecting manner on the contour of the back part of the tool, a fine structure of annealed bainite can produce essential advantages with an automatic leveling of the tool.

Embodiments of the invention are directed to a stamping tool formed from a steel strip shaped on a narrow side with a cutting part having a cutting edge. The stamping tool includes a back part with a contour in cross section on a narrow side of the steel strip, recesses shaped in the back part with free spreading of the material to be transverse to a longitudinal extension of the steel strip and perpendicular to lateral surfaces of the steel strip, such that an extent of the spreading is smaller than a thickness of the steel strip, and undeformed regions located between the recesses.

According to embodiments, the stamping tool can be a cutting rule. Further, the strip steel can be at least one of at least partially thermally treated and/or quenched and tempered. Also, the contour of the back part may include one of a convex contour or a contour having plural projecting convex regions. Still, the recesses may be shaped in a chipless manner by cold forming or embossing, and the undeformed region can be structured to be plastically deformable with a startup of the tool.

In accordance with embodiments, the recesses may have a depth within a range of one of 5 μm to 80 μm and 20 μm to 50 μm.

Further, a ratio of a longitudinal extension of the shaped recess to a longitudinal extension of the undeformed region can be within a range of between one of 1.0 to 4.9 and 1.5 to 3.0.

According to other embodiments of the invention, a distance between two recesses or two undeformed regions may be within a range of one of 0.1 mm to 0.95 mm and 0.35 mm to 0.65 mm.

Moreover, the contour of the back part in cross section can include at least one of rounded or polygonal regions in the longitudinal direction.

In accordance with further embodiments, the steel strip may include a strip body structured with: low-alloy steel with an inner zone having a carbon content between approximately 0.3% by weight to approximately 0.95% by weight; a fine structure achieved by a conversion in the lower bainite range; a hardness within a range of 280 HV to 480 HV; and a surface decarburization zone with a depth on the lateral surfaces within a range of one of 0.01 mm to 0.05 mm and 0.02 mm to 0.04 mm. The undeformed regions to a depth of no more than 95 μm can have a tempering structure formed at a temperature between 300° C. and the austenite formation temperature of the material.

In other embodiments, the steel strip can be structured to be at least one of at least partially thermally treated and/or quenched and tempered, and the cutting region can have a hardness of greater than one of 52 HRC or 550 HV and a rounded cutting edge with a radius within a range of between 0.004 mm and 0.05 mm. The cutting edge may have a cutting surface angle within a range of 50° to 100°. At least one lateral surface can be formed towards the cutting edge with a primary and a secondary facet.

Embodiments of the instant invention are directed to a stamping tool formed from a steel strip shaped. The stamping tool includes a cutting part with a cutting edge and a back part having a contour being shaped on narrow sides of the steel strip. The back part has recesses shaped at least on one lateral surface of the steel strip at an angle to perpendicular to a longitudinal extension in a chipless manner by cold forming with free spreading of the material and having elevations formed over the contour of the back part, such that the elevations are plastically deformable with a startup of the tool.

In embodiments, the elevations over the contour of the back part can be formed by deformation of the lateral surfaces at an angle to one another, can have an extent of 20 μm to 90 μm, and may be spaced apart by a length of 0.1 mm to 0.95 mm.

Embodiments are directed to a production method for a stamping tool formed from a steel strip shaped on a narrow side with a cutting part having a cutting edge and on another narrow side with a back part having a contour in cross section. The method includes producing a strip-shaped blank having a bainitic fine structure from a flat starting material, machining a contour of a back part and a conical cutting part on narrow sides of the strip-shaped blank, working, at room temperature, recesses into the contour of the back part transversely to a longitudinal extension and perpendicular to lateral surfaces of the strip-shaped blank by chipless shaping with free spreading of the material, and using the undeformed regions of the back part during the production of the cutting edge as a desired width measurement of the tool.

According to embodiments of the invention, the stamping tool may be a cutting rule. Also, the strip steel can be at least one of at least partially thermally treated and/or quenched and tempered. Further, the contour of the back part may include one of a convex contour or a contour having plural projecting convex regions. The strip-shaped blank can further have a decarburized edge zone.

Embodiments of the instant invention are directed to a production method for a stamping tool formed from a steel strip shaped on a narrow side with a cutting part having a cutting edge and on another narrow side with a back part having a contour in cross section. The method includes producing a strip-shaped blank having a bainitic fine structure from a flat starting material, machining a contour of a back part and a conical cutting part on narrow sides of the strip-shaped blank, and working, at room temperature, recesses at least on one lateral surface in the region of the back part at an angle thereto perpendicular to the longitudinal extension of the strip by chipless shaping with free spreading of the material, thereby one of leaving undeformed regions or forming elevations over the contour of the back part that project in an opposite direction to the cutting region. The one of undeformed regions and elevations are used as elements during the production of the cutting edge to give a width measurement for the tool.

In accordance with still yet other embodiments of the present invention, the fine bainitic structure of the strip-shaped blank can be produced in an inner zone in cross section, and the method may further include, in an at least one of before and after the working, annealing the one of undeformed regions and elevations up to a depth of no more than 95 μm at a temperature within a range of between 300° C. and the austenite formation temperature of the alloy.

BRIEF DESCRIPTION OF THE DRAWINGS

The invention is explained in greater detail with exemplary embodiments, each of which represents only one way of carrying out the invention, and described based on drawings below.

FIG. 1 illustrates a cutting rule in cross section;

FIG. 1a illustrates a rounded convex contour of a back part in cross section;

FIG. 2 illustrates a plastically deformed back part in cross section;

FIG. 2a illustrates a plastically deformed back part in elevation;

FIG. 5 illustrates a view of machined recesses in the back part;

FIG. 6 illustrates a view of recesses formed in a chipless manner by embossing in the back part;

FIG. 6a/b illustrates a local enlargement of FIG. 6 and a contour line over the recesses in the back part;

FIG. 7 illustrates a contour of a back part with recesses formed in some parts in a chipless manner on the lateral surfaces of the cutting rule in cross section; and FIG. 7a illustrates a back part according to FIG. 7 in elevation.

FIG. 8 illustrates a polygonal convex contour of a back part in cross section;

DETAILED DESCRIPTION OF THE EMBODIMENTS

Figures 3, 3A:
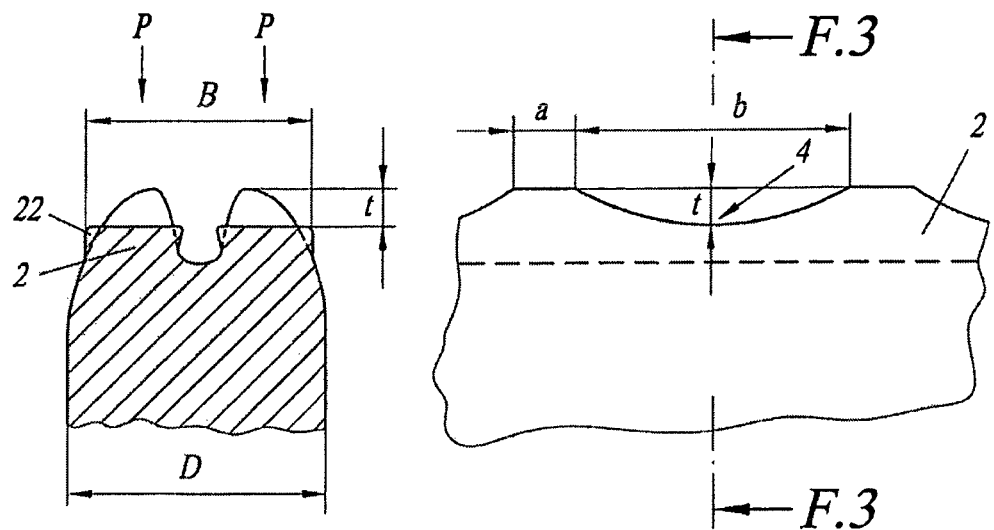
FIG. 3 illustrates a convex region of a back part deformed with free spreading in cross section.
FIG. 3a illustrates the convex region of FIG. 3 in elevation.

FIG. 1 shows diagrammatically in cross section a cutting rule 1 with a back part 2 shaped in a rounded convex manner 211 and, lying opposite, a cutting part 3 with a cutting edge 31, which has a radius 311. Cutting edge 31 can be formed with, e.g., a primary 33 and secondary 34 facet to define a cutting surface angle α, within a range of 50° to 100°. At least one lateral surface can be formed towards the cutting edge with a primary and a secondary facet.

FIG. 1a shows in cross section a back part 2 of a cutting rule with two regions 21, 21' projecting in a convex manner. FIG. 8 shows a back part 2' shaped in a polygonal convex manner 211'.

FIG. 2 shows a shaped back part 2 with free spreading (or plastic material displacement) 22 of the material with a shaping by a tool with a shaping force direction P in cross section (FIG. 2) from FIG. 2a. With a thickness D of the cutting rule 1, an enlarged width B is formed with a depth of impression t by plastic material displacement 22 in the convex back part 2, which, however, has a smaller extent than the rule thickness D.

FIG. 2a shows in elevation a cutting rule 1 with a plastic embossed depth 4 in the convex region on the back part 2. The undeformed back part 2 has a length a, the plastically deformed region has a length with a designation b.

FIG. 3 and FIG. 3a show essentially the same images as in FIG. 2 and FIG. 2a, but the back part 2 comprises two contour regions formed by scraping with free material spread 22 and a total width B.

Figure 4:
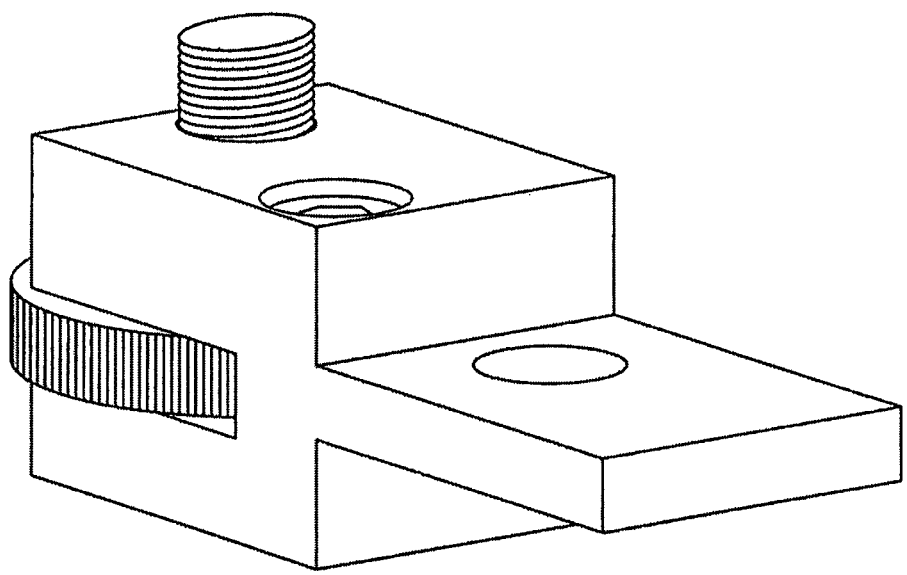
FIG. 4 illustrates an embossing tool.

FIG. 4 shows a tool or stamping wheel for perpendicular deformation for a back part (2) of a cutting rule 1.

FIG. 5 shows in elevation according to the prior art recesses ground into a tool or into a back part 2 of a cutting rule 1, wherein the ground flutes 5 run in the thickness direction of the cutting rule 1.

FIG. 6 shows embossed recesses according to the invention in the back part 2 of a cutting rule 1.

FIG. 6a shows the embossed recesses 4 in an enlarged form. The scraped flutes 6 can still be seen in reduced form in the surface of the embossed flutes 4. Outside the recesses, the scraped flutes convey the material flow with a free spreading in their longitudinal extension through the wave form or bulges in the region of the embossed recesses 4.

FIG. 6b shows a measured height progression in the central convex region 21 of the back part 2 of a cutting rule 1.

FIG. 7 and FIG. 7a show in cross section (FIG. 7) and in elevation a back part 2 with embossed recesses 4 on the lateral surfaces of a cutting rule 1. Elevations 23 with a height oft are formed in a length a by the material flow with a free spread due to the embossed recesses 4 in the lateral surfaces of a cutting rule 1 at an angle to the lateral surface 1, which were made by tools with a force direction $P_1$ and $P_2$. A distance b of the elevations 23 from one another is determined by the tool shape.

A list of reference characters is designed to facilitate the assignment of the functional regions and parts of the tool in the images.

They represent:

1 Cutting rule
2 Back part
21 Convex regions
22 Spread material
23 Elevation
3 Cutting part
31 Cutting edge
311 Cutting edge radius
4 Embossed recess
5 Machined flutes
6 Scraped flutes B Freely spread contour
D Width of the cutting rule
P, $P_1$, $P_2$ Shaping force
a Length of the projecting region
b Length of the recess

The invention claimed is:

1. A stamping tool formed from a steel strip having a height extending between a first narrow side and a second narrow side, and a longitudinal extension transverse to the height and a thickness in a width direction perpendicular to the height and the longitudinal extension, the first narrow side being shaped with a cutting part having a cutting edge, the stamping tool comprising:
   a back part on the second narrow side of the steel strip having deformed regions and undeformed regions; the undeformed regions located between the deformed regions;
   the deformed regions forming recesses extending in the longitudinal extension direction that have been shaped in a chipless manner in the back part, and
   wherein the recesses have bottoms located at a depth t below the undeformed regions, and the bottoms of the recesses have thicknesses in a width direction perpendicular to the height and the longitudinal extension greater than thicknesses in a width direction perpendicular to the height and the longitudinal extension of the undeformed regions at the depth t.

2. The stamping tool according to claim 1 being a cutting rule.

3. The stamping tool according to claim 1, wherein the strip steel is at least one of at least partially thermally treated and/or quenched and tempered.

4. The stamping tool according to claim 1, wherein the contoured material of the back part comprises one of a convex contour or a contour having plural projecting convex regions.

5. The stamping tool according to claim 1, wherein the recesses are shaped in a chipless manner by cold forming or embossing; and
   the undeformed region between the recesses is structured to be plastically deformable with a startup of the tool.

6. The stamping tool according to claim 1, wherein the recesses have a depth within a range of one of 5 μm to 80 μm and 20 μm to 50 μm.

7. The stamping tool according to claim 1, wherein a ratio of a longitudinal extension of the shaped recess to a longitudinal extension of the undeformed region is within a range of between one of 1.0 to 4.9 and 1.5 to 3.0.

8. The stamping tool according to claim 1, wherein a distance between two recesses or two undeformed regions is within a range of one of 0.1 mm to 0.95 mm and 0.35 mm to 0.65 mm.

9. The stamping tool according to claim 1, wherein the contour of the back part in cross section comprises at least one of rounded or polygonal regions when viewed in the longitudinal direction.

10. The stamping tool according to claim 1, wherein the steel strip comprises a strip body structured with:
    low-alloy steel with an inner zone having a carbon content between approximately 0.3% by weight to approximately 0.95% by weight;
    a fine structure achieved by a conversion in the lower bainite range;
    a hardness within a range of 280 to 480 HV; and
    a surface decarburization zone with a depth on the lateral surfaces within a range of one of 0.01 mm to 0.05 mm and 0.02 mm to 0.04 mm,
    wherein the undeformed regions to a depth of no more than 95 μm have a tempering structure formed at a temperature between 300° C. and the austenite formation temperature of the material.

11. The stamping tool according to claim 1, wherein the steel strip is structured to be at least one of at least partially thermally treated and/or quenched and tempered, and the cutting region has a hardness of greater than one of 52 HRC or 550 HV and a rounded cutting edge with a radius within a range of between 0.004 mm and 0.05 mm.

12. The stamping tool according to claim 11, wherein the cutting edge has a cutting surface angle within a range of 50° to 100°.

13. The stamping tool according to claim 12, wherein at least one lateral surface is formed towards the cutting edge with a primary and a secondary facet.

14. A stamping tool formed from a shaped steel strip having a height extending between a first narrow side and a second narrow side, a longitudinal extension transverse to the height and a thickness in a width direction perpendicular to the height and the longitudinal extension, the first narrow side being shaped with a cutting part having a cutting edge, comprising:
    a back part on the second narrow side of the steel strip having elevations and undeformed regions located between the elevations;
    the elevations being shaped in a chip less manner by recesses formed along the longitudinal extension in at least on one lateral surface of the back part,
    wherein the elevations have peaks and the undeformed regions have bottoms located a depth t below the peaks, and the bottoms of the undeformed regions have thicknesses in a width direction perpendicular to the height and the longitudinal extension greater than thicknesses in a width direction perpendicular to the height and the longitudinal extension of the elevations at the depth t below the peaks, and
    wherein the elevations are plastically deformable with a startup of the tool.

15. The stamping tool according to claim 14, wherein the elevations over the contour of the back part are formed by deformation of the lateral surfaces at an angle to one another, have an extent of 20 μm to 90 μm, and are spaced apart by a length of 0.1 mm to 0.95 mm.

* * * * *